Figure 1:
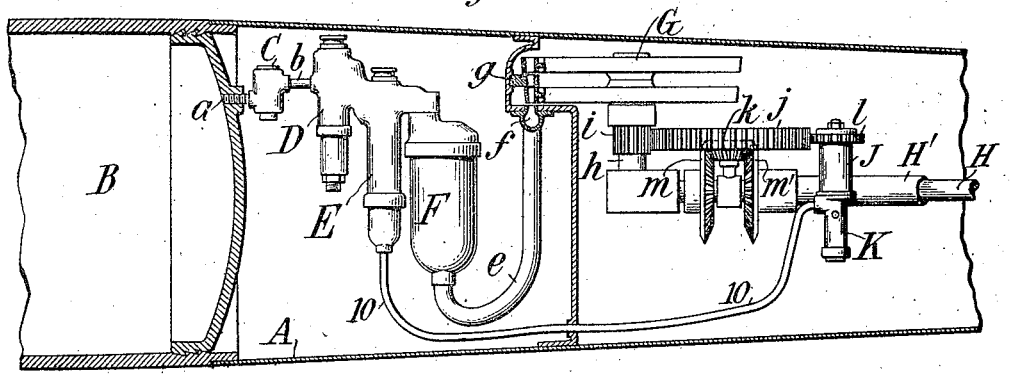

F. M. LEAVITT.
GOVERNOR FOR AUTOMOBILE TORPEDOES.
APPLICATION FILED MAY 1, 1914.

1,124,752.

Patented Jan. 12, 1915.

WITNESSES:
René Bruine
Fred White

INVENTOR:
Frank M. Leavitt,
By Attorneys,
Fraser, Durk & Myers

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

GOVERNOR FOR AUTOMOBILE TORPEDOES.

1,124,752.      Specification of Letters Patent.      Patented Jan. 12, 1915.

Application filed May 1, 1914. Serial No. 835,693.

*To all whom it may concern:*

Be it known that I, FRANK M. LEAVITT, a citizen of the United States, residing at Smithtown, in the county of Suffolk and State of New York, have invented certain new and useful Improvements in Governors for Automobile Torpedoes, of which the following is a specification.

This invention provides a governor for controlling the speed of the engine propelling an automobile torpedo.

In an automobile torpedo propelled by a turbine or other form of engine driven by compressed air, difficulty has heretofore been found in providing means for suitably governing the speed of the engine. The engine operates at such high speed and develops so considerable a power for so brief a time, that the problem of governing its speed has been considered well nigh insuperable. The difficulty of the problem is greatly increased by the necessity for extreme compactness and the prohibition against increasing materially the weight of the torpedo, so that the governor must necessarily be both very small and very light, while at the same time extremely sensitive and capable of controlling instantly the speed of the very small but high-powered engine.

The difficulty of providing a suitable governor has been such that in the practical torpedo art the reduction of the pressure of the stored compressed air to a uniform pressure when fed to the engine has been the sole reliance for maintaining an approximation to uniform speed during the run; in addition to this provisions have been made for shutting off the supply of fluid and stopping the run entirely in case the engine over-speeds, a method which in actual warfare might lose an otherwise effective shot.

An attempt to provide a suitable governor is set forth in my Patent No. 1,088,079 granted February 24, 1914. The device set forth in this patent, although giving highly encouraging results, has not proved in practice to be thoroughly successful.

The present invention provides a governor which has been subjected to exacting preliminary tests and has thus far proven so operative and successful as to encourage the belief that it will meet the exacting requirements in prolonged use on torpedoes in naval service.

According to the present invention a centrifugal governor is provided of very compact design and of great sensitiveness. The stored compressed air, the pressure of which during a run gradually falls from a maximum of 2250 pounds per square inch or upward to an approximation to the working pressure, is passed through a reducing valve which reduces its pressure to somewhat above the working pressure, and then through a secondary valve which is both a reducing and throttle valve, whereby the air pressure is stepped down normally to the exact working pressure at which it should be fed to the engine under ordinary running conditions, and in addition serves also for further throttling the flow of air so as to reduce its pressure below this working pressure whenever the engine tends to over-speed. This secondary valve is under immediate control of the governor, this control being best effected through the medium of a bleeder valve which is operated by the governor and which determines the movements of the secondary reducing and throttle valve.

The accompanying drawings show a suitable and the preferred construction embodying the present invention.

Figure 2:
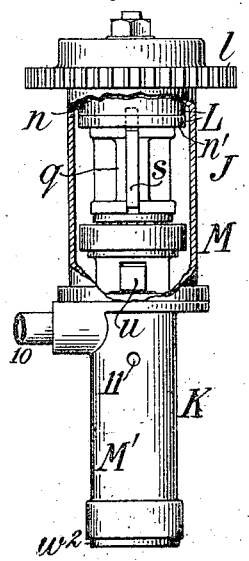
Figure 3:
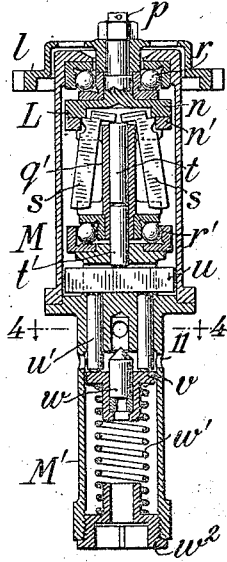
Figure 7:
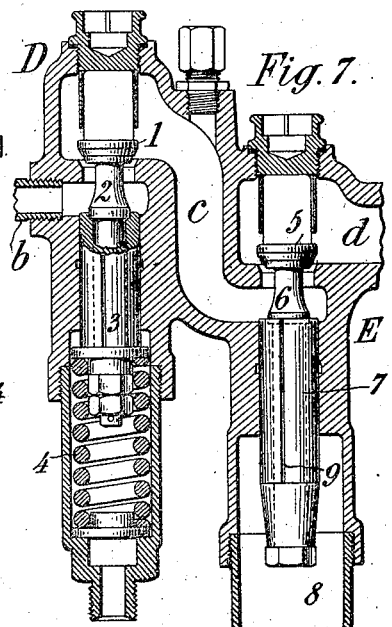
Figure 6:
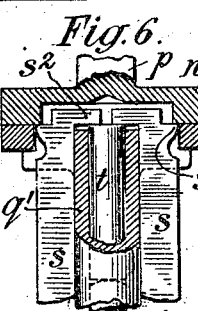
Figure 4:
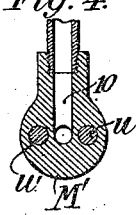
Figure 5:
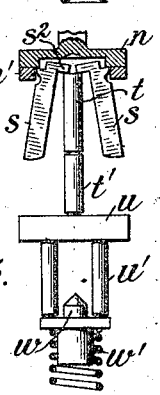
Figure 8:
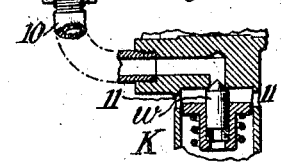

Figure 1 is a vertical longitudinal section of a portion of a torpedo showing those parts necessary to the comprehension of the present invention, the parts being however arranged in a manner to facilitate comprehension rather than in the precise arrangement which is customary in torpedoes of this type where the numerous internal parts are necessarily crowded together with the utmost compactness. Fig. 2 is an elevation of the speed governor or centrifugal element including the casing inclosing the bleeder valve, this casing being partly broken away to show the centrifugal part of the governor. Fig. 3 is a vertical mid-section in a plane at right angles to Fig. 2. Fig. 4 is a horizontal section in a plane on the line 4—4 in Fig. 3. Fig. 5 is an elevation (partly in section) of the working parts of the governor removed. Fig. 6 is a fragment of Fig. 3 drawn to a larger scale showing the parts in the position of rest. Fig. 7 is a mid-section of the primary and secondary reducing valves. Fig. 8 is a mid-section of the bleeder valve showing in dotted lines its connection with the secondary reducing valve.

Referring to Fig. 1, A is the hull or shell of the torpedo, B is the compressed air reservoir or flask, C is the starting valve, which may be of any known construction and operate in a manner well understood so that upon the launching of the torpedo this valve is thrown open; D is the main or primary reducing valve. E is the secondary reducing-throttle valve; F is the usual heater or so-called "superheater"; G is the turbine, which might be substituted by a reciprocating engine so far as the present invention is concerned, and H H' are respectively the inner and outer propeller shafts which at the tail of the torpedo carry respectively the aft and forward propellers. These shafts H and H' are driven from the turbine G through any suitable gearing so as to be revolved at preferably equal speeds in opposite directions, the propellers being as usual of right and left pitch. J is the governor and K is the bleeder valve, which is conveniently constructed in the same casing as the governor, or in a casing or shell forming a continuation thereof. The air from the flask B passes as usual through a tube or duct $a$ to the starting valve C, and thence through a tube or duct $b$ to the main reducing valve D, thence through a duct $c$ (Fig. 7) to the secondary valve E, thence through a duct $d$ to the heater F, and thence through a tube $e$ to the nozzle $f$ of the turbine. The turbine here shown is a two-stage turbine, the two wheels of which are fastened on the same shaft so as to turn together, and between them is interposed the usual reversing block $g$ containing the stationary nozzles or buckets for collecting the fluid from the primary wheel and directing it against the secondary wheel, as is well understood.

The turbine wheels are shown as fixed on a single shaft $h$ carrying a pinion $i$ which meshes with a large gear-wheel $j$ carrying a beveled pinion $k$ which meshes with opposite bevel gears $m$ and $m'$ keyed on the shafts H and H' respectively, whereby these shafts are oppositely driven at corresponding or equal speeds.

The parts thus far referred to except for those features of the secondary valve E, governor J and bleeder valve K to be hereinafter described, are or may be of the customary construction or arrangement, and form no novel part of this invention.

The governor J comprises a rotary member or rotor L which through a gear $l$ is driven from some part connected with the engine, as for example from the gear $j$ as shown. The gear $l$ is shown as fastened on a central spindle $p$ which has on its lower part an annular flange $n$. Beneath this flange is fastened a frame $q$ having an upper flange $n'$. The parts $p\ n\ q$ constitute the rotor; the rotor is pivotally mounted in any suitable way, preferably by means of ball bearings as shown at $r\ r'$, the outer or stationary ball races being supported by the exterior casing or shell M. The rotor carries a plurality of centrifugal arms $s\ s$ which answer to governor balls. These are carried in recesses formed in the frame $q$, whereby they are held in place and driven; and each arm is constructed as a lever having (see Fig. 6) a fulcrum bearing $s'$ against the under side of the flange $n$, and having an arm $s^2$ overlying a central pin $t$ which is movable freely in a tubular socket $q'$ forming part of the frame $q$. The main part of each arm $s$ extends downwardly and forms both the long arm of the lever and the weight which at rest stands vertically as in Fig. 6, and under rotation throws outwardly as in Fig. 3, so that its short arm exerts a downward pressure upon the pin $t$.

The pin $t$ communicates the downward thrust from the governor arms to the bleeder valve K. In the construction shown a cross head $u$ is provided, a second pin $t'$ being interposed; and from the cross head $u$ two pins $u'$ project downwardly and rest in contact with a flanged socket $v$ which carries the cone valve $w$ constituting the essential part of the bleeder valve K. A spring $w'$ presses upwardly against the flange of the socket $v$ reacting downwardly against a screw plug $w^2$ which screws into the lower end of an inclosing shell or casing M' forming a downward extension of the shell M. The upward pressure of the spring $w'$ is communicated to the pin $t$ and acts against the short arms of the governor arms $s$ tending to draw them in and thus opposing the centrifugal force. This spring thus acts in line with the axis of rotation and serves both for drawing in the governor arms and for closing the bleeder valve.

The primary reducing valve D is of known construction, having a valve proper or tappet 1 on the same stem 2 with a balancing plunger 3 which receives also the pressure of a spring 4 tending to open the valve 1; the valve closes when the pressure in the duct $c$ against the outlet side of the valve 1 exceeds the opening tendency due to the stress of the spring.

The valve E is of the same general construction as the valve D, comprising a tappet 5 on a stem 6 with a balancing plunger 7; but instead of the spring 4 this plunger projects into a pressure chamber 8 where the lower end of the plunger receives whatever pressure exists in this chamber; and in some way a slight leakage is provided from the duct $c$ into the chamber 8. This may and in practice is accomplished by the necessary play around the plunger 7 to enable it to work freely; but to make this leakage more apparent, a groove or leakage duct 9 is shown in Fig. 7, and obviously this duct might be in the valve shell instead of the plunger. Air pressure from c acting against the slightly greater area of the plunger 7, closes the valve until sufficient leakage occurs through the duct 9 into the chamber 8, so that the air pressing upwardly against the plunger opens the valve; on the other hand the valve receives on its outlet side d a back pressure against the tappet 5 which tends to close it, so that the movements of the valve are due to the resultant of these opposing pressures. Obviously the operation of such a valve in controlling the flow of air past it may be determined by varying the pressure existing in the chamber 8; and this is the function of the bleeder valve K. From the chamber 8 a tube or duct 10 extends to the inlet of the bleeder valve. This latter valve is shown as comprising a valve seat communicating with this inlet and closed wholly or partially by the cone valve w. When this valve is opened the air escaping past it finds an outlet through holes 11. The opening of the bleeder valve permits the compressed air to escape more or less rapidly from the chamber 8, and hence imparts to the valve E a tendency to close. Conversely the closing of the bleeder valve results in the backing up in the chamber 8 of the pressure resulting from the leakage through the duct 9, and this pressure imparts to the valve E a tendency to open; at its maximum this tendency results in the valve opening until the maximum working pressure for the engine exists on the outlet side of the valve, whereupon this pressure tends to close the valve and prevents the eduction pressure rising higher than this maximum.

In operation, let it be assumed that the initial pressure in the air flask is for example 2250 pounds; this pressure may be reduced by the primary valve D to for example 600 pounds; and this pressure may be reduced by the secondary valve E to for example a maximum of 450 pounds and a minimum of whatever further diminution of pressure may be necessary to restrain the engine to its determined speed. Upon the launching of the torpedo the opening of the starting valve C admits the compressed air through the valves D E and heater F to the engine; the engine starts slowly because of its inertia and that of the propellers and the intervening shafts and gearing; the rotation of the engine is communicated through the gears j l to the governor. So long as the engine is below its normal speed the governor is inactive and the bleeder valve K is held closed by its spring w', so that the compressed air leaking into the chamber 8 is retained and its pressure accumulates in that chamber until it substantially balances the pressure in the duct c, thereby delivering the air to the engine at the maximum pressure (say 450 pounds). As the engine accelerates to normal speed the governor arms fly out, and when the maximum speed is reached, the centrifugal effect of these arms, communicated by a downward thrust through the pins t t', cross head u, and pins u' to the bleeder valve, opens this valve and permits an escape of air which lowers the pressure in the chamber 8, and consequently results in a closing movement of the valve E; this movement may be greater or less according to the rapidity of rotation of the governor and the consequent extent of opening of the bleeder valve. The closing movement of the valve E results in a throttling of the flow, whereby the volume and pressure of air delivered to the engine are reduced and the speed of the engine is correspondingly checked. As the engine slows down the governor relaxes its pressure and the bleeder valve is partially closed, thereby checking the escape of air from the chamber 8 and increasing the pressure therein, so that the valve E is caused to partially open, thereby passing more air at increased pressure to the engine. A condition of equilibrium is quickly reached at which the engine rotates at normal speed and the governor exerts only sufficient opening thrust against the bleeder valve to keep it partially open to just such extent as to compensate for the leakage into the chamber 8, and keep the pressure in this chamber at exactly the point required to cause the valve E to remain open to just the extent necessary to feed air to the engine at the precise pressure required for keeping the engine running at the normal prescribed speed.

The operation of the system depends upon there being a continual but variable leakage of air into and out of the chamber 8, its escape from this chamber being under control of the speed governor. The amount of air thus lost is so slight as to be negligible; but it affords a medium for enabling a very sensitive governor to effect the control of the valve E which controls the flow of air at a pressure and volume such as to represent a very considerable energy—in actual torpedo practice about 100 horse power. The disparity of the controlling and controlled forces is so great as to permit the governor to be made so small and light that its weight does not materially affect the buoyancy of the torpedo, and its construction is so compact that it may be practicably introduced within the narrow space available. Under exacting conditions this governor has been found to keep the speed of the engine so nearly constant as to answer all practical requirements of torpedo service.

It must not be inferred from the detail with which the preferred embodiment of the invention is described that the invention is limited to the details set forth. The invention is susceptible of considerable modification in applying it to other types of torpedoes, or under other conditions.

I claim as my invention:—

1. An automobile torpedo having a source of compressed fluid, an engine, and an intervening reducing valve, combined with a speed governor and a secondary reducing-throttle valve, the latter controlled by said governor to throttle the fluid delivered at a secondary reduced pressure to the engine.

2. An automobile torpedo having a source of compressed fluid, an engine, and an intervening reducing valve, combined with a speed governor and a secondary reducing-throttle valve, and a bleeder valve controlling the latter, the governor operating said bleeder valve to control said reducing-throttle valve.

3. An automobile torpedo having a source of compressed fluid, an engine, and an intervening reducing valve, combined with a speed governor and a secondary reducing-throttle valve, the latter comprising a balancing plunger and a chamber communicating therewith, and a bleeder valve communicating with said chamber and operated by the governor.

4. An automobile torpedo having a source of compressed fluid, an engine, and an intervening reducing valve, combined with a speed governor and a secondary reducing-throttle valve, the latter comprising a balancing plunger and a chamber communicating therewith, and a bleeder valve communicating with said chamber, the latter valve having a spring for closing it, and the governor connected to operate said valve being adapted under excessive speed to open the valve against said spring.

5. An automobile torpedo having a source of compressed fluid, an engine, and an intervening reducing valve, combined with a speed governor comprising a rotor geared to the engine, governor arms carried by said rotor and adapted to fly out under centrifugal force, a spring pressed part movable in line with the axis of rotation, and connections from the governor arms to said part whereby the stress of the spring is communicated to draw in the governor arms.

6. An automobile torpedo having a source of compressed fluid, an engine, and an intervening reducing valve, combined with a speed governor comprising a rotor geared to the engine, governor arms carried by said rotor and adapted to fly out under centrifugal force, a bleeder valve movable in line with the axis of rotation, interposed connections for communicating movement between said arms and valve, and a spring pressing said valve toward its seat and pressing through said connections to tend to draw the governor arms inward.

7. An automobile torpedo having a source of compressed fluid, an engine, and an intervening reducing valve, combined with a speed governor comprising a rotor geared to the engine, governor arms carried by said rotor and adapted to fly out under centrifugal force, a stationary member having bearings for said rotor, a spring pressed part movable in said stationary member, and a pin movable through the axis of the rotor to communicate motion between said governor arms and spring-pressed part.

8. An automobile torpedo having a source of compressed fluid, an engine, and an intervening reducing valve, combined with a speed governor comprising a rotor geared to the engine, governor arms carried by said rotor and adapted to fly out under centrifugal force, a stationary member having bearings for said rotor and comprising a casing inclosing said rotor, a spring-pressed part movable in said stationary member, and connections between said part and said governor arms.

9. An automobile torpedo having a source of compressed fluid, an engine, and an intervening reducing valve, combined with a speed governor comprising a rotor geared to the engine, governor arms carried by said rotor extending when at rest substantially parallel to the axis of rotation, having a rocking fulcrum engagement with the rotor and having short arms projecting toward the axis, and an axial pin engaged by said short arms, and a spring the stress of which is communicated through said pin to said arms.

In witness whereof, I have hereunto signed my name in the presence of two subscribing witnesses.

FRANK M. LEAVITT.

Witnesses:
H. C. SEAMAN,
JOHN D. McTUPE.